United States Patent [19]

Grab et al.

[11] Patent Number: 4,562,052

[45] Date of Patent: Dec. 31, 1985

[54] PROCESS FOR THE REMOVAL OF NITROGEN OXIDES FROM NITRIC ACID PLANT TAIL GAS

[75] Inventors: George D. Grab, Bethlehem; Sheldon W. Dean, Allentown, both of Pa.

[73] Assignee: Air Products and Chemicals, Inc., Allentown, Pa.

[21] Appl. No.: 629,034

[22] Filed: Jul. 9, 1984

[51] Int. Cl.$^4$ ..................... C01B 21/00; C01B 21/38; C01B 21/40

[52] U.S. Cl. .................... 423/235; 423/390; 423/393; 423/394

[58] Field of Search .................. 423/235, 235 D, 239, 423/239 A, 390, 394, 393

[56] References Cited

U.S. PATENT DOCUMENTS

| | | | |
|---|---|---|---|
| 4,053,555 | 10/1977 | Bolme | 423/235 |
| 4,118,460 | 10/1978 | Bolme | 423/235 |
| 4,138,470 | 2/1979 | Bolme | 423/390 |
| 4,312,852 | 1/1982 | Dewey | 423/393 |

OTHER PUBLICATIONS

Handbook of Chemistry and Physics; 44th edition; Chemical Rubber Pub. Co., Cleveland, Ohio, (1963), pp. 2047-2048.

*Primary Examiner*—Gregory A. Heller
*Attorney, Agent, or Firm*—Mark L. Rodgers; E. Eugene Innis; James C. Simmons

[57] ABSTRACT

The present invention involves a process for removing nitrogen oxides from an off gas stream, such as nitric acid plant tail gas. The off gas is scrubbed with concentrated nitric acid to remove nitrogen oxides to a concentration below about 200 ppm. The nitric acid used in the scrubbing step is subsequently stripped of recovered nitrogen oxides which can be recycled back to a nitric acid plant. The oxidized nitric acid is recovered as concentrated nitric acid which can be used in the initial scrubbing step and/or recovered as product.

12 Claims, 1 Drawing Figure

U.S. Patent
Dec. 31, 1985
4,562,052
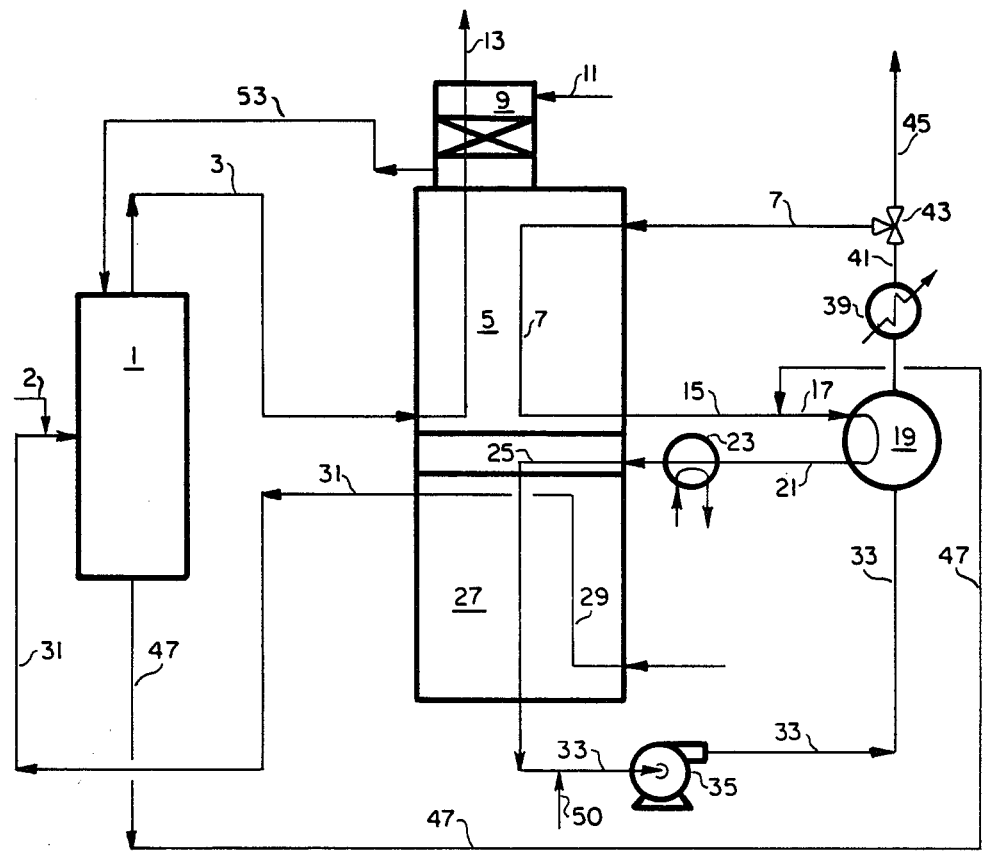

PROCESS FOR THE REMOVAL OF NITROGEN OXIDES FROM NITRIC ACID PLANT TAIL GAS

TECHNICAL FIELD OF THE INVENTION

The present invention relates to the removal of nitrogen oxides from an off gas stream, such as nitric acid plant tail gas, by scrubbing with concentrated nitric acid.

BACKGROUND OF THE INVENTION

Nitrogen oxides, such as nitric oxide, nitrogen dioxide and the like are present in substantial quantities in the off gas produced during various industrial operations, such as nitric acid production. Previously these nitrogen oxides were simply discharged into the atmosphere, but modern air pollution standards now limit the quantities which may be discharged. Consequently, various processes have been developed to reduce or eliminate the nitrogen oxides in waste gas streams prior to their discharge into the atmosphere.

One such process uses catalytic combustion of the waste gases in a hot catalyst bed where reactions occur that destroy the nitrogen oxides. This process requires excess fuel to be added making it economically unattractive. Additionally the nitrogen oxides are destroyed, and hence cannot be recovered for subsequent use.

Another process has been reported whereby nitrogen oxides are removed from waste gas streams by contacting them with molecular sieves. These molecular sieves are normally in the form of granular solids which absorb the nitrogen oxides. The nitrogen oxides are subsequently desorbed under controlled conditions and recovered.

Bolme, in U.S. Pat. Nos. 4,053,555; 4,118,460; and 4,138,470 discloses a method for removing nitric oxide from gases by contacting the gases with aqueous solutions containing nitrate ions in sufficient concentration to oxidize the nitric oxide to nitrous acid and retain it in solution under stable conditions. The scrubbing solution is then regenerated under controlled conditions, producing a gas stream which contains the recovered nitrogen oxides in relatively high concentration and a scrubbing solution which can be recycled. The aqueous scrubbing solution can be nitric acid up to a concentration of 11.5 molar.

BRIEF SUMMARY OF THE INVENTION

The present invention provides for a process for removing nitrogen oxides present in off gases, such as tail gas from a nitric acid plant, to levels acceptable under modern pollution control regulations. The process comprises scrubbing the off gas containing nitrogen oxides with 55%–70% nitric acid to oxidize the nitrogen oxides, thereby forming a combined $HNO_2/HNO_3$ stream and a purified off gas stream within the pollution control requirements. The combined $HNO_2/HNO_3$ stream is then heated to between 50° and 150° C. and contacted with a stripping gas stream to remove $HNO_2$ and regenerate the concentrated $HNO_3$ stream and produce a concentrated nitrogen oxide stream. The concentrated nitrogen oxide stream can be recycled back to a nitric acid plant, while the concentrated $HNO_3$ stream is recycled for scrubbing the off gas and/or recovered as concentrated $HNO_3$ product. The purified off gas is further treated by contact with $H_2O$ to remove any residual $HNO_3$.

The present process has the advantage over the process disclosed by Bolme in that concentrated nitric acid is used to scrub the off gas. This allows the scrubbing process to be integrated directly with a nitric acid plant producing the off gas. Such nitric acid plants generally produce nitric acid at a concentration between 55%–70%, and unlike the Bolme process, this acid can be employed in the scrubbing operation without the necessity of being diluted. Additionally the regenerated $HNO_3$ scrubbing liquid is at a concentration sufficient for it to be recovered as a desirable product without further processing.

Concentrated $HNO_3$ also requires less contact time to absorb and oxidize the nitrogen oxides, and hence provides for a more economical and efficient process.

BRIEF DESCRIPTION OF THE DRAWING

The single FIGURE is a schematic flow diagram of one embodiment of the present invention.

DETAILED DESCRIPTION OF THE INVENTION

The present invention provides for a process for removing nitrogen oxides from off gases, such as the tail gas from a nitric acid plant. Such gases can contain all forms of nitrogen oxides such as $N_2O$, NO, $N_2O_3$ and $NO_2$, with NO being the predominant form. The process can be run at any pressure up to about 8 atmospheres.

The nitrogen oxides are absorbed and oxidized by scrubbing with nitric acid according to the reaction:

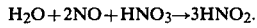
$$H_2O + 2NO + HNO_3 \rightarrow 3HNO_2.$$

This oxidation reaction removes NO from the incoming off gas, resulting in a combined $HNO_2/HNO_3$ scrubbing stream and a purified off gas stream. The purified off gas stream is subsequently contacted with a scrubbing liquid, such as $H_2O$, to remove any residual $HNO_3$. For best results this scrubbing liquid should be at ambient temperature or cooler. This results in a purified off gas stream which contains less than 200 ppm, and preferably less than 100 ppm by volume nitrogen oxides and can be discharged into the atmosphere.

The nitric acid used to scrub the incoming nitrogen oxides is preferably at a temperature of about 25° C. and at a concentration of at least 55% and preferably greater than 60%. Due to azeotrope formation the highest concentration which can be obtained is about 70%.

The combined $HNO_2/HNO_3$ scrubbing stream is subsequently heated to about 50° to 150° C., and contacted with a stripping stream, such as bleach air, to produce nitrogen oxides according to the following or a similar reaction:

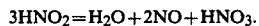
$$3HNO_2 = H_2O + 2NO + HNO_3.$$

This results in a concentrated nitrogen oxide stream and a regenerated nitric acid stream at a concentration between 55% and 70%. The concentrated nitrogen oxide stream is recovered and subsequently treated by any conventional means, preferably it is recycled back to a nitric acid plant absorber to be used in nitric acid production.

The regenerated nitric acid stream can optionally be contacted with an oxidizing agent, such as hydrogen peroxide, to remove any trace HNO$_2$ which was not stripped by the above reaction. The regenerated nitric acid stream is at a temperature between 50° and 150° C., and can be used to heat the combined HNO$_2$/HNO$_3$ scrubbing stream, thereby cooling the nitric acid stream to between 30° and 40° C. Subsequently a portion of this nitric acid stream is recycled to scrub the incoming nitrogen oxide containing off gas while the remainder is recovered as a high concentration nitric acid product.

This process is superior to the previously used catalytic combustion operations in that it eliminates the need for excess fuel to produce a reducing atmosphere in the catalytic combustor; it produces increased yields of nitric acid; it eliminates catalyst cost; and it results in the complete removal of HNO$_2$ from the acid product.

Bolme, in the previously cited patents, discloses a nitrogen oxide stripping process using up to 11.5 normal HNO$_3$. In column 9, lines 14–24 of all three of the cited patents, Bolme teaches that due to several considerations such as nitric acid volatility and the necessity to limit the oxidation reaction HNO$_2 \rightarrow$NO$_2$, the nitrate ion concentration is limited to 1.0–11.5 normal if nitric acid alone is used as the nitrate ion source.

In the case of nitric acid which has one replaceable hydrogen ion, the maximum 11.5 normal equals 11.5 molar. Converting this to grams per liter using the formula:

$$\text{molarity} = \frac{\text{Grams Solute}}{(\text{molecular weight solute})(\text{liters of solution})}$$

the maximum concentration taught by Bolme is about 724.5 g/l. Referring to the table for nitric acid on pp. 2047–2048 of the Handbook of Chemistry and Physics; 44th edition; Chemical Rubber Pub. Co., Cleveland, Ohio (1963), it can be calculated that the maximum HNO$_3$ concentration used by Bolme is about 54.5%.

We have found, however, that nitrogen oxides can be recovered from off gases more effectively than is taught by Bolme, if a more concentrated HNO$_3$ stream is used. Specifically a HNO$_3$ stream of a concentration between 55%–70%, and preferably between 60%–70%. Using this concentrated nitric acid to scrub the off gas allows the present process to be directly integrated with an operating HNO$_3$ plant. The product HNO$_3$ from the plant can be employed directly as the scrubbing gas without first being diluted. Additionally, a portion of the regenerated HNO$_3$ scrubbing gas can be recovered as product at the same concentration as the HNO$_3$ product from the nitric acid plant. This results in a much simpler process which produces a more concentrated HNO$_3$ product. Also, the more concentrated HNO$_3$ requires less contact time to scrub the nitrogen oxide containing off gas, hence, a smaller column or an increased off gas flow rate can be employed.

The problem of nitric acid volatility, as cited by Bolme, is overcome by contacting the off gas, after it has been scrubbed, with a second scrubbing liquid, such as water, to remove any residual HNO$_3$ before the gas is discharged. The water or other scrubbing liquid containing the residual HNO$_3$ can then be sent back to the HNO$_3$ plant as absorber feedwater. Also, the decomposition of HNO$_2$ which limits the adsorption according to HNO$_2$+HNO$_3 \rightarrow$2NO$_2$+H$_2$O was found not to be a problem when using concentrated nitric acid. This is due to the fact that during the scrubbing step, the reaction does not reach equilibrium, and hence very little NO$_2$ is formed.

The present invention is a major improvement in the art in that it can be fully integrated with a nitric acid plant which typically produces an HNO$_3$ product at a concentration above about 57%. The recovered HNO$_3$ product from the present process is at or near the concentration of the HNO$_3$ produced by the plant and therefore can be recovered as a fungible product.

One particular embodiment of the present invention can be described by reference to the accompanying figure. The following description applies to a 350 ton-per-day plant operating at about 7 atm. absolute pressure. An off gas stream 3 at ambient temperature or above exits an absorber 1 of a nitric acid plant. Typically this off gas stream 3, contains, volumetrically, between 1,000–4,000 ppm nitrogen oxides. The off gas stream 3 enters an absorption column 5 where it is scrubbed by countercurrent flow with a concentrated; between 55%–70%; nitric acid stream 7 at a temperature of about 25° C. The concentrated nitric acid absorbs and oxidizes the nitrogen oxides in the off gas stream 3 to produce a purified off gas stream 13 and a combined HNO$_2$/HNO$_3$ stream 15.

Due to the high concentration of HNO$_3$ used to scrub the off gas, it is necessary to pass the purified off gas through a second absorber 9 where it is contacted with a scrubbing liquid 11, such as water, to remove any residual HNO$_3$. The purified off gas stream 13 containing less than 200 ppm nitrogen oxides is then discharged into the atmosphere. The scrubbing liquid leaving absorber 9 as stream 53 may be recovered for subsequent treatment such as returning it to the HNO$_3$ plant as absorber feedwater.

The combined HNO$_2$/HNO$_3$ stream 15 leaves the absorber 5 at a temperature of about 25° C. Concentrated nitric acid product, stream 47, from the nitric acid plant absorber 1, at a temperature of about 40° C. is added to combined HNO$_2$/HNO$_3$ stream 15 to form stream 17. This nitric acid is at a concentration between 55%–70% and can be added directly to the system without being initially diluted. Stream 17 is passed through heat exchanger 19 where it is heated to about 105° C. to form stream 21. This heated stream 21 is further heated in heat exchanger 23 to produce a combined HNO$_2$/HNO$_3$ stream 25 at about 115° C.

This combined heated HNO$_2$/HNO$_3$ stream 25 is passed through a stripping column 27 where it is contacted by countercurrent flow with an oxidizing stream 29, such as bleach air, at a rate of about 900 moles per hour (mph) to strip the nitrogen oxides from the HNO$_3$ scrubbing liquid. The total HNO$_2$ which must be stripped by the bleach air is about 30 mph which is converted to about 20 mph of NO. Contact with bleach air produces a concentrated nitrogen oxide stream 31, and a regenerated concentrated (i.e., 55%–70%) HNO$_3$ scrubbing stream 33 at a temperature of about 115° C. The concentrated nitrogen oxide stream 31 typically contains about 900 mph air, 100 mph H$_2$O, 20 mph HNO$_3$ and 20 mph NO and is at a temperature of about 115° C. This concentrated nitrogen oxide stream is recovered and returned to the HNO$_3$ plant absorber 1 where it joins inlet stream 2.

An oxidizing agent, such as hydrogen peroxide shown as stream 50, can be added to the regenerated HNO$_3$ scrubbing stream 33 to remove any trace HNO$_2$. A pump 35 is used to convey the regenerated HNO$_3$ scrubbing steam 33 back through the system, where, while still at about 115° C. it is used as a heat source for heat exchanger 19 to heat the combined HNO$_2$/HNO$_3$ stream 17. The HNO$_3$ stream leaves heat exchanger 19 cooled to about 33° C., and enters heat exchanger 39 where it is further cooled to about 25° C., stream 41.

The cooled, regenerated HNO$_3$ stream 41 passes through valve 43 where a portion (stream 7) is used to scrub incoming off gas 3, and the remainder is recovered as high concentration HNO$_3$ product, stream 45.

This process results in the purified off gas stream 13 containing less than the maximum allowable 200 ppm, by volume, nitrogen oxides, and a nitric acid product stream 45 at a concentration between 55%–70%.

Having thus described the present invention, what is now deemed appropriate for Letters Patent is set out in the following appended claims.

What is claimed is:

1. A process for removing nitrogen oxides present in an off gas stream, said process comprising:
    (a) scrubbing the nitrogen oxide containing off gas with 55%–70% nitric acid to absorb and oxidize the nitrogen oxides, thereby forming a combined HNO$_2$/HNO$_3$ stream and a purified off gas stream;
    (b) heating the combined HNO$_2$/HNO$_3$ stream to between 50° and 150° C.;
    (c) contacting the combined HNO$_2$/HNO$_3$ stream with a stripping stream to produce a concentrated HNO$_3$ stream and a concentrated nitrogen oxide stream;
    (d) recovering the concentrated nitrogen oxide stream;
    (e) recovering the concentrated HNO$_3$ stream and using a portion to scrub the nitrogen oxide containing off gas in step (a) and recovering the remainder as concentrated HNO$_3$ product; and
    (f) contacting the purified off gas stream of step (a) with a scrubbing liquid to remove any residual HNO$_3$.

2. The process in accordance with claim 1 wherein said purified off gas contains less than 200 ppm nitrogen oxides.

3. The process in accordance with claim 2 wherein said concentrated HNO$_3$ product is at a concentration between 55%–70%.

4. The process in accordance with claim 3 wherein said stripping gas stream in step (c) is bleach air.

5. The process in accordance with claim 4 wherein the concentrated HNO$_3$ stream of step (e) is passed through a pump.

6. The process in accordance with claim 5 wherein the 55%–70% nitric acid used in step (a) to absorb and oxidize the nitrogen oxides in the off gas is the product of the HNO$_3$ plant which generates the off gas.

7. The process in accordance with claim 6 wherein the concentrated HNO$_3$ stream in step (e) is used to heat the combined HNO$_2$/HNO$_3$ stream in step (b).

8. The process in accordance with claim 7 wherein the nitrogen oxide containing off gas is from a nitric acid plant.

9. The process in accordance with claim 8 wherein the recovered concentrated nitric oxide stream is recycled back to the nitric acid plant.

10. The process in accordance with claim 9 wherein the scrubbing liquid used in step (f) is H$_2$O.

11. The process in accordance with claim 10 where an oxidizing agent is added to the concentrated nitric acid stream in step (c) to remove any trace HNO$_2$.

12. The process in accordance with claim 11 wherein the oxidizing agent is H$_2$O$_2$.

* * * * *